(12) United States Patent
Ayrapetian et al.

(10) Patent No.: US 9,036,816 B1
(45) Date of Patent: May 19, 2015

(54) FREQUENCY DOMAIN ACOUSTIC ECHO CANCELLATION USING FILTERS AND VARIABLE STEP-SIZE UPDATES

(71) Applicant: Amazon Technologies, Inc., Reno, NV (US)

(72) Inventors: Robert Ayrapetian, Morgan Hill, CA (US); Yuwen Su, Cupertino, CA (US); Arnaud Jean-Louis Charton, Livermore, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/210,154

(22) Filed: Mar. 13, 2014

(51) Int. Cl.
*H04M 9/08* (2006.01)
*H04M 1/20* (2006.01)
*H04B 3/23* (2006.01)

(52) U.S. Cl.
CPC ............... *H04M 1/20* (2013.01); *H04B 3/232* (2013.01); *H04M 9/082* (2013.01)

(58) Field of Classification Search
None
See application file for complete search history.

(56) References Cited

U.S. PATENT DOCUMENTS

2005/0147235 A1* 7/2005 Telukuntla ............... 379/406.01
2012/0136654 A1* 5/2012 Lou et al. ..................... 704/205

* cited by examiner

*Primary Examiner* — Fan Tsang
*Assistant Examiner* — Jeffrey Lytle
(74) *Attorney, Agent, or Firm* — Knobbe, Martens Olson & Bear, LLP

(57) ABSTRACT

A acoustic echo canceller (AEC) system may be configured to perform echo cancellation in the frequency domain. Features are disclosed for determining an estimated echo in the frequency domain using adaptive filters. An adaptive filter corresponding to a frequency bin can comprise a plurality of filter taps. Additional features are disclosed for updating the adaptive filter. In addition, a frequency-bin dependent step size controller may be used to control a step size used in updating the adaptive filters. Features are disclosed for determining the frequency-bin dependent step size.

20 Claims, 5 Drawing Sheets

US 9,036,816 B1

FREQUENCY DOMAIN ACOUSTIC ECHO CANCELLATION USING FILTERS AND VARIABLE STEP-SIZE UPDATES

BACKGROUND

A device for bi-directional audio-based communication typically may include both a loudspeaker and a microphone. The loudspeaker is used to play back audio signals received from a remote ("far-end") source, while the microphone is used to capture audio signals from a local ("near-end") source. In the case of a telephone call, for example, the near- and far-end sources may be people engaged in a conversation, and the audio signals may contain speech. An acoustic echo occurs when the far-end signal emitted by the loudspeaker is captured by the microphone, after undergoing reflections in the local environment.

An acoustic echo canceller (AEC) may be used to remove acoustic echo from an audio signal captured by a microphone, in order to facilitate improved communication. The AEC typically filters the microphone signal by determining an estimate of the acoustic echo, and subtracting the estimate from the microphone signal to produce an approximation of the true near-end signal. The estimate is obtained by applying a transformation to the far-end signal emitted from the loudspeaker. The transformation may implemented using an adaptive algorithm such as least mean squares, normalized least mean squares, or their variants, which are known to persons of ordinary skill in the art.

An AEC may perform echo cancellation in the time domain and the frequency domain. When performing the echo cancellation in the time domain, an AEC typically performs a convolution operation on the output signal with respect to filter coefficients. When performing the echo cancellation in the frequency domain, an AEC first typically obtains a frequency-domain representation of the output signal, which may be obtained by performing a Fast Fourier Transform (FFT) operation on the output signal. The frequency-domain representation of the output signal generally includes a magnitude and phase value for each frequency bin in the FFT. The FFT operation may be performed on the output signal to obtain a frequency-domain representation comprising any number of frequency bins. For example, the frequency-domain representation of the output signal may include 256 frequency bins. For each frequency bin in the frequency-domain representation of the output signal, the AEC may modify the signal by multiplying the values of the frequency bins with weights. The result of the multiplication process is a modified filtered output signal. To obtain the modified output signal in the time domain, an inverse Fourier transform may be performed on the frequency-domain filtered output signal.

The adaptive transformation relies on a feedback loop, which continuously adjusts a set of coefficients that are used to calculate the estimated echo from the output signal. Different environments produce different acoustic echoes from the same output signal, and any change in the local environment may change the way that echoes are produced. By using a feedback loop to continuously adjust the coefficients, an AEC can adapt its echo estimates to the local environment in which it operates.

The feedback-based adaptation scheme works better in some situations than in others, so it may be beneficial to increase or decrease the rate of adaptation in different situations. The rate of adaptation may be controlled by adjusting a parameter referred to as "step size." A larger step size will increase the rate of adaptation, and a smaller step size will decrease it.

When adaptation is first initiated, a relatively large step size is desirable because it will allow the AEC coefficients to quickly converge on a good approximation of the actual echo produced by the local environment. Once the AEC has converged, however, a smaller step size may be more desirable. With a smaller step size, any adjustments to the AEC coefficients will be less abrupt, and the feedback loop will therefore be less susceptible to disruptive inputs like background noise and double talk, which occurs when the output signal and a local sound source are both simultaneously active.

As described above, existing methods of filtering the output signal in the frequency domain utilize weights. These weights have difficulty estimating echo arising in more complex instances of harmonic distortion. In addition, these weights cannot account for time delay in the echo estimates. Accordingly, the capability of the weights is limited.

In addition, existing step size control schemes assume that the step size is the same for each frequency bin. Accordingly, if the step size control scheme employs a relatively small step size because of disruptive inputs like background noise and double talk, the same small step size will be used for all frequency bins, even if the disruptive input is not present in all frequency bins. Using a smaller step size for the frequency bins not affected by the disruptive input provides a suboptimal rate of convergence for the AEC coefficients corresponding to such frequency bins.

Although these problems have been framed in reference to an audio-based communication system, the same problems may be encountered in any field in which echo cancellation is performed. For example, measurement of echo is a task performed in gigabit internet applications, which employs a higher-frequency reference signal than used in audio applications. The disclosure described herein is equally applicable to any such fields.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, the present disclosure relates to performing frequency-domain echo cancellation using filters.

For at least one frequency bin in a frequency-domain representation of an output signal, an AEC may filter the signal using a filter. For other frequency bins in the frequency-domain representation of an output signal, the AEC may use a weight instead of a filter. Accordingly, the processing the AEC applies to each frequency bin may vary.

In addition, the present disclosure relates to updating the filter used to perform frequency-domain echo cancellation using a frequency-bin dependent step size. For each frequency bin in a frequency-domain representation of an output signal, a step-size controller may determine a variable frequency-bin dependent step size. Further explanation is provided below, with reference to accompanying figures.

Figure 1:
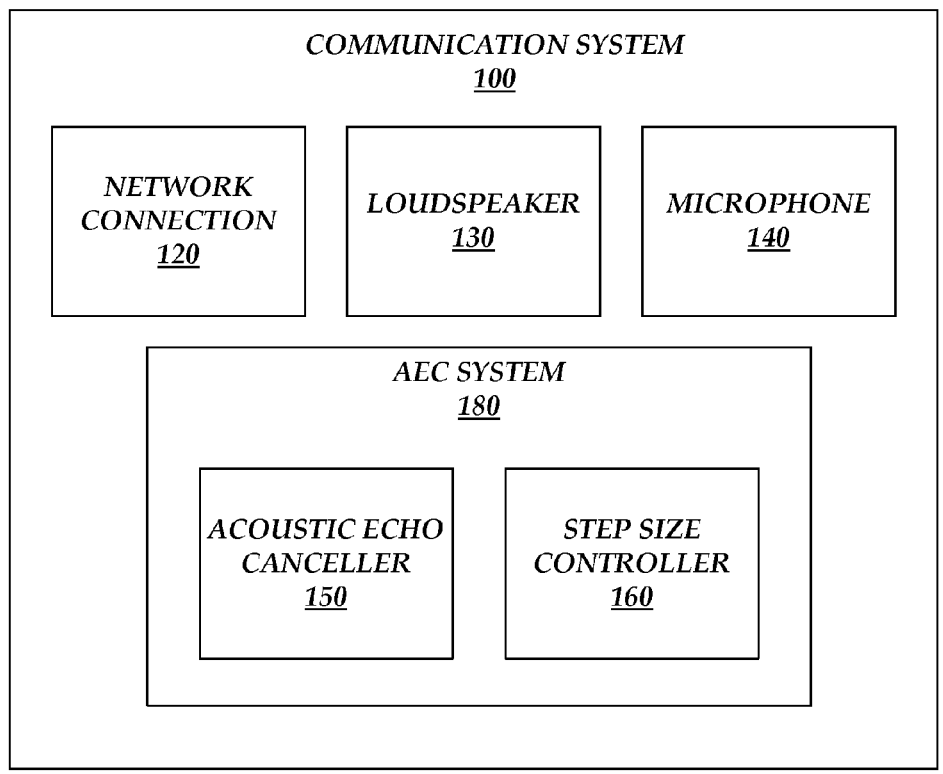
FIG. 1 is a block diagram illustrating components of some communication systems that include acoustic echo cancellers with step size controllers.

FIG. 1 shows an example of a communication system 100. Communication system 100 may be implemented in hardware and/or software using techniques known to persons of skill in the art. For example, communication system 100 may be implemented by a single telecommunication device, such as a mobile phone, or by a combination of several devices such as a mobile computing device and a network-accessible server.

FIG. 1 shows components that may appear in communication system 100, including a network connection 120, a loudspeaker 130, a microphone 140, and an AEC system 180. AEC system 180 includes an acoustic echo canceller 150, and a step size controller 160.

Network connection 120 may be used to send and receive communication signals over a network. The network may be any wired network, wireless network, or combination thereof. In addition, the network may be a personal area network, local area network, wide area network, cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate intranet. The network may include one or more wireless networks, such as a Wi-Fi network, a Global System for Mobile Communications (GSM) network, a Code Division Multiple Access (CDMA) network, a Long Term Evolution (LTE) network, or some other type of wireless network. Secured protocols such as Hypertext Transfer Protocol Secure (HTTPS) may be used to secure communications across the network, e.g., by encryption. Protocols and components for communicating via the Internet or any of the other aforementioned types of networks are well known to those skilled in the art of computer communications and thus, need not be described in more detail herein.

The communication signals that are sent and received by network connection 120 may include a far-end output signal, which may be emitted from loudspeaker 130, and an AEC output signal, produced by acoustic echo canceller 150. The AEC output signal may be determined by adaptively filtering a signal from microphone 140. For the sake of simplicity, microphone 140 is referred to herein as a single component. However, in some embodiments, multiple microphones may be used together and an AEC system (or portions of an AEC system) may be provided for each one. Within AEC system 180, step size controller 160 may determine step sizes on a continuous basis to control the rate of adaptation in acoustic echo canceller 150. Additional aspects of AEC system 180 are described below, with respect to FIGS. 2-5.

Figure 2:
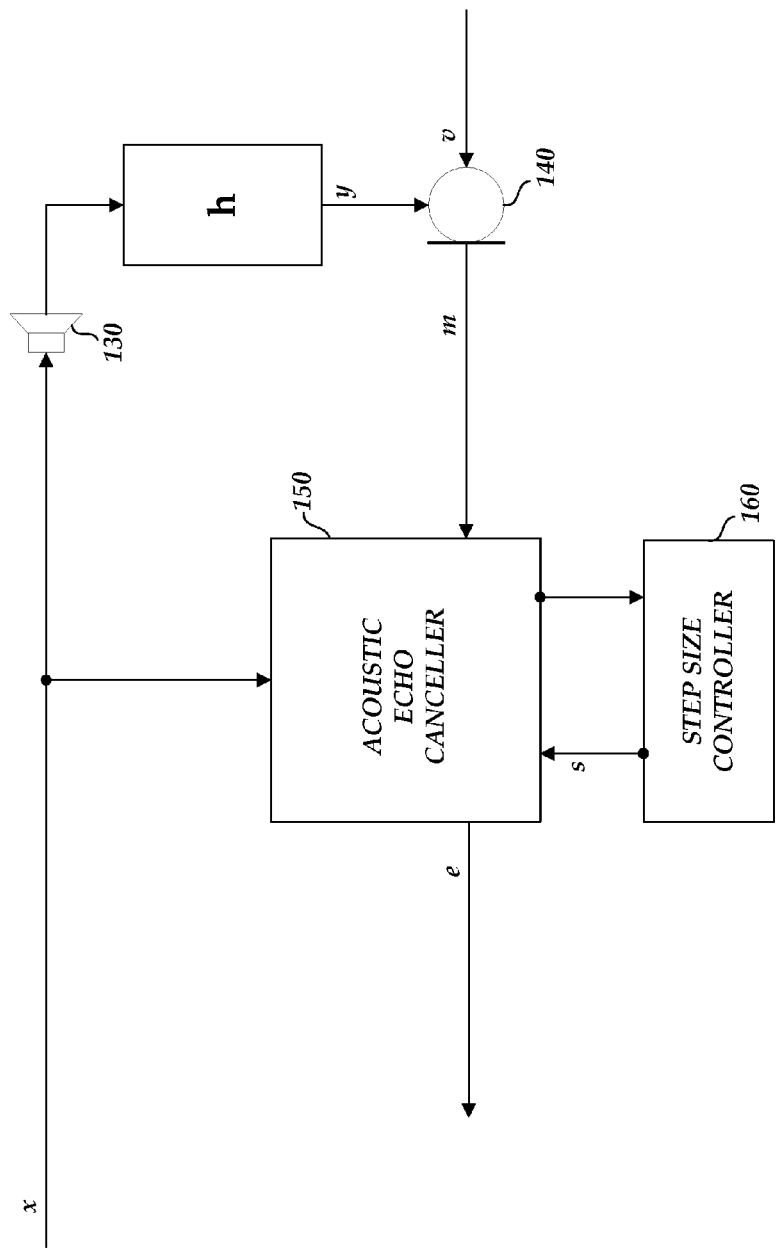
FIG. 2 is a signal diagram depicting the relationships between various signals that are used to perform acoustic echo cancellation in accordance with the present disclosure.

FIG. 2 is a signal diagram that illustrates the relationships between various signals and components that are relevant to acoustic echo cancellation. Certain components of FIG. 2 correspond to components from FIG. 1, and retain the same numbering. These components include loudspeaker 130, microphone 140, acoustic echo canceller 150, and step size controller 160. The signals depicted in FIG. 2 include far-end signal x, acoustic echo y, near-end signal v, microphone signal m, and AEC output e. FIG. 2 also depicts acoustic transfer function h.

In the example of FIG. 2, acoustic echo may occur as follows. Far-end signal x is emitted from loudspeaker 130 and undergoes various reflections in the local environment according to acoustic transfer function h, yielding acoustic echo y. Microphone 140 captures both acoustic echo y and near-end signal v, which together produce microphone signal m. The presence of acoustic echo y in microphone signal m may interfere with the recognition of near-end signal v by a listener, thereby hindering communication. Accordingly, it may be desirable to filter microphone signal m in order to remove acoustic echo y, to the extent that such removal is possible.

AEC 150 may be configured to filter microphone signal m in the following manner. Samples of a received output signal x may be collected in an input buffer. For example, during a period of time, L new samples of output signal x may be received and collected in an input buffer. Previously, N−1 samples may have already been received and collected in the input buffer. The N−1 previous samples and L new samples together form a frame of the output signal x comprising N+L−1 samples. In some embodiments, the frame may comprise 4096 N+L−1 samples, of which 128 are L new samples. In other configurations, the frame can comprise any combination and number of new and previous samples. For example, in some embodiments, the frame may comprise only new samples (e.g., 128 new samples, or 4096 new samples, etc.).

The AEC 150 may convert a current frame of N+L−1 samples of the output signal x to a frequency-domain representation X. For example, the AEC 150 may determine a frequency-domain representation X of the output signal x by performing a Fourier transform (e.g., using a FFT algorithm) on the output signal x. The frequency-domain representation X of the output signal generally includes a magnitude and phase value for each frequency bin m in the signal. Accordingly, the frequency-domain representation X of the output signal may be represented as a vector X(m), for frequency bin m=0, 1, ..., M−1; where M=N+L−1. The frame size may be chosen so that the frequency-domain representation X of the output signal comprises any number of frequency bins. For example, if a frame includes 4096 samples, the frequency bin number m would range from 0 to 4095.

In some embodiments, the AEC 150 may filter the frequency-domain representation X of the output signal in the frequency domain using weights W. For example, the weights W comprise a weight for each frequency bin m. For each frequency bin m, there is an associated weight W(m), for frequency bin m=0, 1, ..., M−1. Each weight W(m) specifies a single complex-valued weight corresponding to frequency bin m.

A frequency-domain estimated echo P may be calculated using the frequency-domain representation X of the output signal and the weights W(m). For each frequency bin m in the frequency-domain representation X of the output signal, the AEC 150 may filter the signal X(m) by multiplying the values of the output signal X(m) with weights W(m) on an element by element basis. For example, the frequency-domain estimated echo P(m) may be calculated using the equation $P(m)=X(m)*W(m)$ for each frequency bin m=0, 1, ..., M−1.

In other embodiments, adaptive filters W may comprise a plurality of filter taps for at least one frequency bin m. In particular, for a frequency bin, a first adaptive filter W(m) may comprise a K tap-filter specified by W(m)=[$W_{m0}$ $W_{m1}$ ... $W_{mK-1}$]. A frequency bin m may correspond to K instances of delayed frequency bins of the frequency-domain representation X of the output signal. For example, the current and previous values of the frequency-domain representation X of the output signal at frequency bin m may be represented as XX(m), where XX(m)=[$X_{m0}$ $X_{m1}$ ... $X_{mK-1}$]. Here, $X_{m0}$ corresponds to the value of the current frequency bin X(m), $X_{m1}$ corresponds to the first previous value of the frequency bin X(m), and $X_{mK-1}$ corresponds to the K previous value of the frequency bin X(m). For each frequency bin m in the frequency-domain representation X of the output signal, the AEC 150 may filter the signal XX(m) by performing a convolution of the values of the output signal XX(m) with adaptive filter W(m). For example, the frequency-domain estimated echo P(m) may be calculated using the equation P(m)=$X_{m0}*W_{m0}+X_{m1}*W_{m1}+\ldots X_{mK-1}*W_{mK-1}$ for each frequency bin m=0, 1, ..., M−1. So, calculation of the frequency-domain estimated echo may be based in part on at least one previously-calculated frequency-domain estimated echo.

Although the adaptive filters W(m) may comprise a plurality of filter taps for at least one frequency bin m, the adaptive filters W(m) may also comprise a single tap for other frequency bins. For example, for a particular frequency bin, a single-tap filter may function the same as a weight. In particular, adaptive filters W(m) may comprise, for a certain frequency bin, a filter comprising a plurality of filter taps, and for another frequency bin, adaptive filters W(m) may comprise a weight. The adaptive filters W(m) may comprise a number of filter taps per frequency bin that is based on a harmonic distortion level at the frequency bin. Utilizing a greater number of filter taps for a frequency bin increases the accuracy and precision of the AEC 150 for that particular frequency bin. Accordingly, if an output signal is known or determined to have greater harmonic distortion at certain frequency bins, the adaptive filters W(m) may have a greater number of filter taps for those frequency bins. For example, the adaptive filters W(m) may have five filter taps, ten filter taps, or more for frequency bins known to suffer from harmonic distortion. For frequency bins known to correspond to human speech, the adaptive filters W(m) may include a greater number of filter taps. For example, the filters may comprise at least five filter taps per frequency bin for frequency bins between 1 kHz and 4 kHz. Conversely, for frequency bins known not to correspond to human speech, the adaptive filters W(m) may simply comprise a single tap for each frequency bin in order to reduce unnecessary computation complexity. For example, the adaptive filters W(m) may comprise a single tap for each frequency bin above 4 kHz. In addition, the adaptive filters W(m) do not necessarily comprise the same number of filter taps for every frequency bin m. For example, depending on the accuracy and precision needed for a particular frequency bin, the adaptive filters W(m) may have fewer or greater numbers of filter taps for each frequency bin. In another example, frequency bins m=1 to 10 could have a single tap, frequency bins m=11 to 25 could have 5 tap filters, frequency bins m=26 to 100 could have 3 tap filters, while frequency bins m=101 to the last frequency bin (N+L−1) could have a single tap.

To obtain the filtered output signal in the time domain, an inverse Fourier transform may be performed on the frequency-domain filtered output signal P(m). For example, a time-domain estimated echo ŷ may be determined based on the frequency-domain estimated echo P(m) by computing the inverse FFT of the frequency-domain estimated echo P(m). Computing the inverse FFT of the frequency-domain estimated echo P(m) yields a time-domain estimated echo ŷ comprising N+L−1 samples. However, only the last L samples of the time-domain estimated echo ŷ correspond to the adaptive filter output.

Next, the AEC 150 may determine a time-domain error e based on a difference between the time-domain estimated echo ŷ and an actual echo. For example, the AEC 150 may receive the microphone signal m comprising an actual echo y of the output signal. The AEC 150 may determine L time-domain error samples e(k) based on the equation e(k)=ŷ(k)−y(k), for sample values k=0, 1, ..., L−1.

The AEC 150 may determine a frequency-domain error representation E of the time-domain error e. In particular, the AEC 150 may convert the time-domain error samples e(k) back to the frequency domain. In some embodiments, to prepare the time-domain error samples e(k) for conversion to the frequency domain using an FFT algorithm, and to ensure the same number of frequency bins as the output signal X, the AEC 150 may extend the time-domain error samples e(k) to length N+L−1. For example, the AEC 150 may append N−1 zeros to the beginning of the time-domain error vector such that the last L samples of the error vector are the determined samples e(k). Then, the AEC 150 may determine the frequency-domain error representation E by determining the FFT of the time-domain error vector e.

In some embodiments, the AEC 150 may determine an updated adaptive filter using the previous adaptive filter, the frequency-domain error representation E, and the frequency-domain representation X of the output signal. For example, in embodiments in which the adaptive filters W comprise a single tap for each frequency bin m, the updated adaptive filters $W(m)_{new}$ may be calculated as follows:

$$W(m)_{new}=W(m)_{previous}+mu*E(m)*\mathrm{conj}(X(m))/\sigma^2_x(m),$$
$$m=0,1,\ldots,M-1$$

In this equation, $W(m)_{new}$ is the updated adaptive filters, $W(m)_{previous}$ is the previous adaptive filters, mu is a constant representing the step size, E(m) is the frequency-domain error representation, conj(X(m)) is the complex conjugate of the frequency-domain representation X(m) of the output signal, and $\sigma_x(m)$ is a standard deviation of power of frequency bin X(m). In particular, $\sigma^2_x(m)$ may represent an average power of the frequency-domain representation X(m). For example, $\sigma^2_x(m)$ may represent a moving average. In this example, the step size mu is constant and is not frequency bin-dependent.

In embodiments in which adaptive filters W comprise a plurality of filter taps for at least one frequency bin m, the updated adaptive filters $W(m)_{new}$ for any frequency bin m for which the adaptive filter comprises a plurality of filter taps K may be calculated as follows:

$$W(m,j)_{new}=W(m,j)_{previous}+mu*E(m)*\mathrm{conj}(X(m,j))/\sigma^2_x(m), j=0,1,\ldots,K-1$$

In this equation, $W(m,j)_{new}$ is the updated filter for the frequency bin m and filter tap j, $W(m,j)_{previous}$ is the previous filter for the frequency bin m and filter tap j, mu is a constant representing the step size, E(m) is the frequency-domain error representation, conj(X(m,j)) is the complex conjugate of the j-th previous frequency-domain representation X of the output signal at the frequency bin m, and $\sigma_x(m)$ is a standard deviation of power of frequency bin X(m). In particular, $\sigma^2_x(m)$ may represent an average power of the frequency-domain representation X(m). For example, $\sigma^2_x(m)$ may represent a moving average. In this example, the step size mu is constant and is not frequency bin-dependent.

As described above, AEC 150 may determine on estimated echo ŷ based on frequency-domain analysis of the output signal x and adaptive filters W. The estimation of the adaptive filters W may be adaptive. For example, new adaptive filters W may be automatically and continuously updated based on previous adaptive filters W. The rate of adaptation used in this feedback loop may depend on step size. In the above examples, the step size mu was constant. However, the step size may also be variable. In particular, a value of a frequency bin-dependent variable step size VSS(m) may be determined by step size controller 160. The frequency-bin dependent step size VSS(m) may affect determination of the updated adaptive filters, as described below.

The step size controller 160 may determine a frequency bin-dependent variable step size VSS(m) for each frequency bin m=0, 1, . . . , M−1. In some embodiments, determining the frequency bin-dependent step size VSS(m) may comprise determining an average power of the frequency-domain representation of the output signal, determining an average power of the frequency-domain error representation, determining a numerator based on the average power of the frequency-domain representation of the output signal, determining a denominator based on the average power of the frequency-domain representation of the output signal and the average power of the frequency-domain error representation, and dividing the numerator by the denominator to determine the frequency-bin dependent step size. In particular, an average power of the frequency-domain representation of the output signal $\sigma_x^2(m)$ may be determined based on the equation $\sigma_x^2(m)=\beta*\sigma_x^2+(1-\beta)*|X(m)|^2$. In this equation, $\beta$ is a constant between the values of zero and 1 that represents a smoothing factor, and $|X(m)|^2$ represents the square of the magnitude of the frequency-domain representation X(m) of the output signal at the frequency bin m. In addition, an average power of the frequency-domain error representation $\sigma_e^2(m)$ may be determined based on the equation $\sigma_e^2(m)=\beta*\sigma_e^2+(1-\beta)*|E(m)|^2$. In this equation, $\beta$ is the another constant between the values of zero and 1 that represents another smoothing factor, and $|E(m)|^2$ represents the square of the magnitude of the frequency-domain error representation E(m). The $\beta$ value used in the equation to determine $\sigma_e^2(m)$ may be the same or different than the $\beta$ value used in the equation to determine $\sigma_x^2(m)$.

The step size controller 160 may determine a frequency bin-dependent variable step size VSS(m) based on the average power of the frequency-domain representation of the output signal $\sigma_x(m)$ and the average power of the frequency-domain error representation $\sigma_e(m)$. For example, the step size controller 160 may determine a frequency-bin dependent variable step size VSS(m) based on the following equation:

$$VSS(m)=\alpha*\sigma_x^2(m)/(\alpha*\sigma_x^2(m)+\sigma_e^2(m)), m=0,1,\ldots,M-1$$

In this equation, $\alpha$ corresponds to an average power of the background noise. In some applications, a value of $\alpha$ of 0.01 may be used. As can be seen from the above equation, in determining the frequency-bin dependent variable step size VSS(m), the step size controller 160 may determine a numerator $\alpha*\sigma_x^2(m)$ that is based on the average power of the frequency-domain representation of the output signal $\sigma_x(m)$. In addition, the step size controller 160 may determine a denominator $\alpha*\sigma_x^2(m)+\sigma_e^2(m)$ that is based on the average power of the frequency-domain representation of the output signal $\sigma_x(m)$ and the average power of the frequency-domain error representation $\sigma_e(m)$. The step size controller 160 may divide the numerator by the denominator to determine the frequency-bin dependent step size VSS(m).

The frequency bin-dependent variable step size VSS(m) may become smaller as the average power of the frequency-domain error representation $\sigma_e(m)$ becomes larger relative to the average power of the frequency-domain representation of the output signal $\sigma_x(m)$. For example, as the average power of the frequency-domain error representation $\sigma_e(m)$ becomes larger relative to the average power of the frequency-domain representation of the output signal $\sigma_x(m)$, the denominator becomes larger relative to the numerator, and the frequency-bin dependent variable step size VSS(m) approaches zero. In contrast, as the average power of the frequency-domain error representation $\sigma_e(m)$ becomes smaller relative to the average power of the frequency-domain representation of the output signal $\sigma_x(m)$, the numerator approaches the same value as the denominator, and the frequency-bin dependent variable step size VSS(m) approaches one.

The frequency-bin dependent step size VSS(m) may affect determination of the updated adaptive filters by the AEC 150. For example, the step size controller 160 may send a step size signal s comprising the frequency-bin dependent step size VSS(m) to the AEC 150. Alternatively, in some embodiments, the step size controller 160 may be implemented as a module within the AEC 150.

In some embodiments, the AEC 150 may determine updated adaptive filters using the previous adaptive filters, the frequency-domain error representation E, the frequency-domain representation X of the output signal, and the frequency-bin dependent step size VSS(m). For example, in embodiments in which the adaptive filters W comprise a single tap for each frequency bin m, the updated adaptive filters $W(m)_{new}$ may be calculated as follows:

$$W(m)_{new}=W(m)_{previous}+mu*VSS(m)*E(m)*\mathrm{conj}(X(m))/\sigma_x^2(m), m=0,1,\ldots,M-1$$

In particular, the constant step size mu is adjusted by the frequency-bin dependent step size VSS(m), which scales the step size mu to a new value between zero and mu.

In embodiments in which adaptive filters W comprise a plurality of filter taps for at least one frequency bin m, the updated adaptive filters $W(m)_{new}$ for any frequency bin m for which there are a plurality of filter taps K may be calculated as follows:

$$W(m,j)_{new}=W(m,j)_{previous}+mu*VSS(m)*E(m)*\mathrm{conj}(X(m,j))/\sigma_x^2(m), j=0,1,\ldots,K-1$$

Again, the constant step size mu is adjusted by the frequency-bin dependent step size VSS(m), which scales the step size mu to a new value between zero and mu.

As the average power of the frequency-domain error representation $\sigma_e(m)$ becomes larger relative to the average power of the frequency-domain representation of the output signal $\sigma_x(m)$, the frequency bin-dependent variable step size VSS(m) approaches zero. This small variable step size VSS(m) indicates a disruptive input such as background noise or a double talk condition. As the variable step size VSS(m) approaches zero, the updated adaptive filters $W(m)_{new}$ remain approximately the same as the previous adaptive filters $W(m)_{previous}$ or $W(m,j)_{previous}$. This is desirable so that the updated adaptive filters are not unduly influenced by background noise or a double talk condition. However, because the variable step size VSS(m) depends on frequency bin m, the variable step size VSS(m) may become smaller for frequency bins m affected by background noise or a double talk condition while remaining larger for frequency bins m not affected by background noise or a double talk condition. Accordingly, for frequency bins m affected by background noise or a double talk condition, the updated adaptive filters remain approximately the same as the previous values, whereas for frequency bins m not affected by background noise or a double talk condition, the new adaptive filters may be updated to better adapt to the local environment.

The signals described above are illustrative, and an AEC system may include a variety of additional signals beyond those depicted in FIG. 2 without departing from the inventive concepts described herein. For example, step size controller 160 may use additional or different input signals apart from those depicted in FIG. 2.

Processes for Frequency-Domain Echo Cancellation

Figure 3:
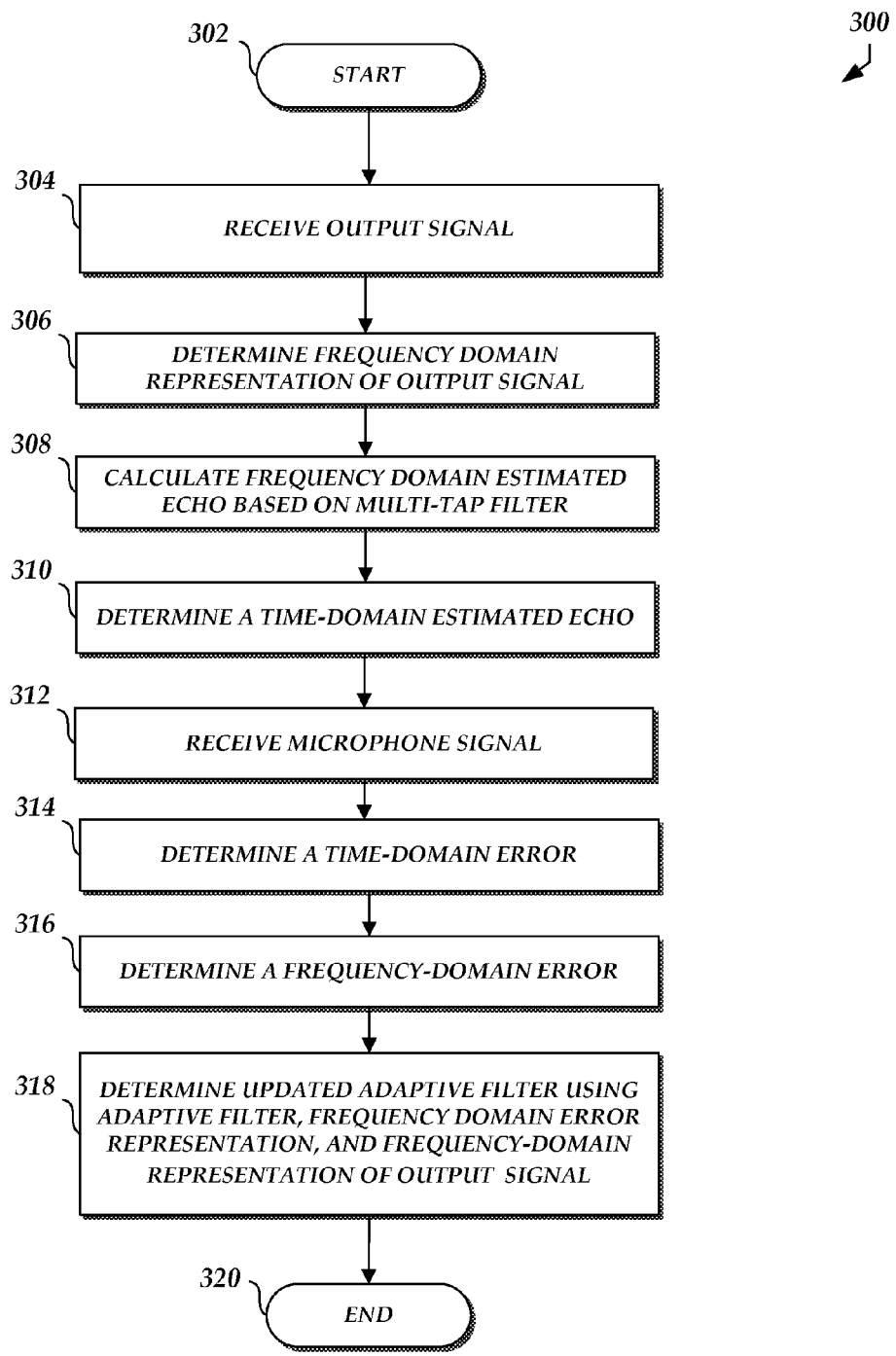
FIG. 3 is a flow diagram of an illustrative process for performing acoustic echo cancellation in the frequency domain using filters in accordance with aspects of the present disclosure.

With reference now to FIG. 3, an example process 300 for performing acoustic echo cancellation in the frequency domain using filters according to an embodiment will be described. The process 300 may be embodied in hardware, a set of executable program instructions, or a combination of hardware and executable program instructions. The process 300 may be performed, for example, by the AEC 150 of FIG. 2. Although the process 300 of FIG. 3 will be described with respect to the components of FIG. 2, the process 300 is not limited to implementation by, or in conjunction with, any specific component shown in FIG. 2. In some embodiments, the process 300, or some variant thereof, may be implemented by alternative components, by the components of FIG. 2 in a different configuration, etc.

The process 300 begins at block 302. At block 304, an output signal is received. For example, AEC 150 receives an output signal x.

At block 306, a frequency-domain representation of the output signal is determined. For example, the AEC 150 determines a frequency-domain representation $X(m)$ of the output signal, the frequency-domain representation comprising a plurality of frequency bins m. The AEC 150 may determine the frequency-domain representation $X(m)$ of the output signal x by computing the FFT of the output signal x.

At block 308, a frequency-domain estimated echo is calculated using a first adaptive filter. For example, the AEC 150 may calculate a frequency-domain estimated echo $P(m)$ using the frequency-domain representation X of the output signal and a first adaptive filter $W(m)$. The first adaptive filter $W(m)$ may correspond to a first frequency bin m and comprise a plurality of filter taps. The frequency-domain estimated echo $P(m)$ may be calculated using the equation $P(m)=X_{m0}*W_{m0}+X_{m1}*W_{m1}+\ldots X_{mK-1}*W_{mK-1}$ for the first frequency bin m that is associated with a K-tap filter. For other frequency bins, a filter may comprise a single tap. The frequency-domain estimated echo $P(m)$ may be calculated using the equation $P(m)=X(m)*W(m)$ for each frequency bin m that is associated with a single-tap filter.

At block 310, a time-domain estimated echo may be determined. For example, the AEC 150 may determine a time-domain estimated echo $\hat{y}$ using the frequency-domain estimated echo $P(m)$ by computing the inverse FFT of the frequency-domain estimated echo $P(m)$. Computing the inverse FFT of the frequency-domain estimated echo $P(m)$ may yield a time-domain estimated echo $\hat{y}$ comprising N+L−1 samples. However, only the last L samples of the time-domain estimated echo $\hat{y}$ correspond to the adaptive filter output.

At block 312, a microphone signal is received. For example, microphone 140 receives a microphone signal m comprising an actual echo.

At block 314, a time domain error may be determined. For example, the AEC 150 may determine a time-domain error e based on a difference between the time-domain estimated echo $\hat{y}$ and an actual echo. The AEC 150 may receive the microphone signal m comprising an actual echo y of the output signal. The AEC 150 may determine L time-domain error samples e(k) based on the equation $e(k)=\hat{y}(k)-y(k)$, for sample values k=0, 1, ..., L−1.

At block 316, a frequency-domain error may be determined. For example, the AEC 150 may determine a frequency-domain error representation E of the time-domain error e. In particular, the AEC 150 may convert the time-domain error samples e(k) back to the frequency domain. The AEC 150 may extend the time-domain error samples e(k) to length N+L−1. For example, the AEC 150 may append N−1 zeros to the beginning of the time-domain error vector such that the last L samples of the error vector are the determined samples e(k). Then, the AEC 150 may determine the frequency-domain error representation E by determining the FFT of the time-domain error vector e.

At block 318, an updated first adaptive filter may be determined using the adaptive filter, the frequency-domain error representation, and the frequency-domain representation of the output signal. For example, the AEC 150 may determine an updated first adaptive filter using the first adaptive filter, the frequency-domain error representation E, and the frequency-domain representation X of the output signal. For example, the updated adaptive filter $W(m)_{new}$ may be calculated as follows:

$$W(m,j)_{new}=W(m,j)_{previous}+mu*E(m)*\text{conj}(X(m,j))/\sigma^2_x(m), j=0,1,\ldots,K-1$$

Alternatively, an updated adaptive filter $W(m)_{new}$ for any frequency bin m for which there are a plurality of filter taps K may be calculated using a frequency bin-dependent step size $VSS(m)$ as follows:

$$W(m,j)_{new}=W(m,j)_{previous}+mu*VSS(m)*E(m)*\text{conj}(X(m,j))/\sigma^2_x(m), j=0,1,\ldots,K-1$$

At block 320, the process 300 ends. The process 300 may be executed in a continuous or substantially continuous loop as additional frames are processed and the adaptive filters are updated.

Figure 4:
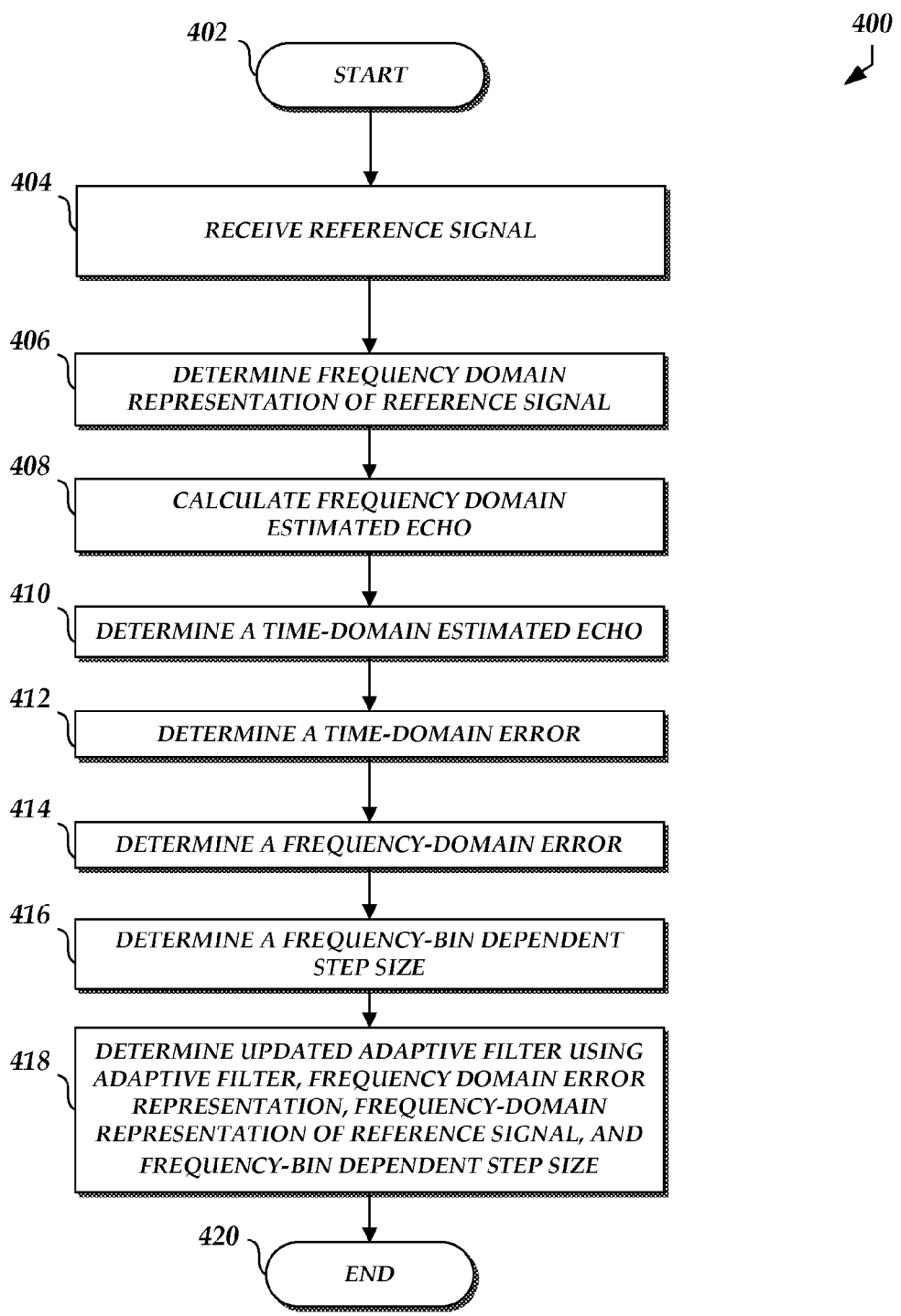
FIG. 4 is a flow diagram of an illustrative process for performing acoustic echo cancellation in the frequency domain using a frequency-bin dependent step size in accordance with aspects of the present disclosure.

Turning now to FIG. 4, an example process 400 for performing acoustic echo cancellation in the frequency domain using a frequency-bin dependent step size according to an embodiment will be described. The process 400 may be embodied in hardware, a set of executable program instructions, or a combination of hardware and executable program instructions. The process 400 may be performed, for example, by the AEC 150 and step size controller 160 of FIG. 2. Although the process 400 of FIG. 4 will be described with respect to the components of FIG. 2, the process 400 is not limited to implementation by, or in conjunction with, any specific component shown in FIG. 2. In some embodiments, the process 400, or some variant thereof, may be implemented by alternative components, by the components of FIG. 2 in a different configuration, etc.

The process 400 begins at block 402. At block 404, a reference signal is received. For example, AEC 150 receives a reference signal x.

At block 406, a frequency-domain representation of the reference signal is determined. For example, the AEC 150 determines a frequency-domain representation $X(m)$ of the reference signal, the frequency-domain representation comprising a plurality of frequency bins m. The AEC 150 may determine the frequency-domain representation $X(m)$ of the reference signal x by computing the FFT of the reference signal x.

At block 408, a frequency-domain estimated echo is calculated. For example, the AEC 150 may calculate a frequency-domain estimated echo $P(m)$ using the frequency-domain representation X of the reference signal and a first adaptive filter W(m). In some embodiments, the first adaptive filter W(m) may correspond to a first frequency bin and comprise a plurality of filter taps.

At block 410, a time-domain estimated echo may be determined. For example, the AEC 150 may determine a time-domain estimated echo ŷ using the frequency-domain estimated echo P(m) by computing the inverse FFT of the frequency-domain estimated echo P(m). Computing the inverse FFT of the frequency-domain estimated echo P(m) may yield a time-domain estimated echo ŷ comprising N+L−1 samples. However, only the last L samples of the time-domain estimated echo ŷ correspond to the adaptive filter output.

At block 412, a time domain error may be determined. For example, the AEC 150 may determine a time-domain error e based on a difference between the time-domain estimated echo ŷ and an actual echo. The AEC 150 may receive the microphone signal m comprising an actual echo y of the reference signal. The AEC 150 may determine L time-domain error samples e(k) based on the equation $e(k)=ŷ(k)−y(k)$, for sample values $k=0, 1, \ldots, L-1$.

At block 414, a frequency-domain error may be determined. For example, the AEC 150 may determine a frequency-domain error representation E of the time-domain error e. In particular, the AEC 150 may convert the time-domain error samples e(k) back to the frequency domain. The AEC 150 may extend the time-domain error samples e(k) to length N+L−1. For example, the AEC 150 may append N−1 zeros to the beginning of the time-domain error vector such that the last L samples of the error vector are the determined samples e(k). Then, the AEC 150 may determine the frequency-domain error representation E by determining the FFT of the time-domain error vector e.

At block 416, a frequency-bin dependent step size may be determined. For example, the step size controller 160 may determine a frequency-bin dependent step size VSS(m) using the average power of the frequency-domain representation of the reference signal $\sigma_x^2(m)$ and the average power of the frequency-domain error representation $\sigma_e^2(m)$. In particular, the step size controller 160 may determine a frequency-bin dependent variable step size VSS(m) based on the following equation:

$$\text{VSS}(m) = \alpha^* \sigma_x^2(m) / (\alpha^* \sigma_x^2(m) + \sigma_e^2(m)), m=0,1,\ldots,M-1$$

At block 418, an updated adaptive filter may be determined using the previous adaptive filter, the frequency-domain error representation, the frequency-domain representation of the reference signal, and frequency-bin dependent step size. For example, the AEC 150 may determine an updated adaptive filter using the adaptive filter, the frequency-domain error representation E, the frequency-domain representation X of the reference signal, and the frequency-bin dependent step size VSS(m). In some embodiments in which filters are applied to each frequency bin m, the updated adaptive filters $W(m)_{new}$ may be calculated as follows:

$$W(m)_{new} = W(m)_{previous} + mu^* \text{VSS}(m)^* E(m)^* \text{conj}(X(m)) / \sigma_x^2(m), m=0,1,\ldots,M-1$$

At block 420, the process 400 ends. The process 400 may be executed in a continuous or substantially continuous loop as additional frames are processed and the adaptive filters are updated.

Figure 5:
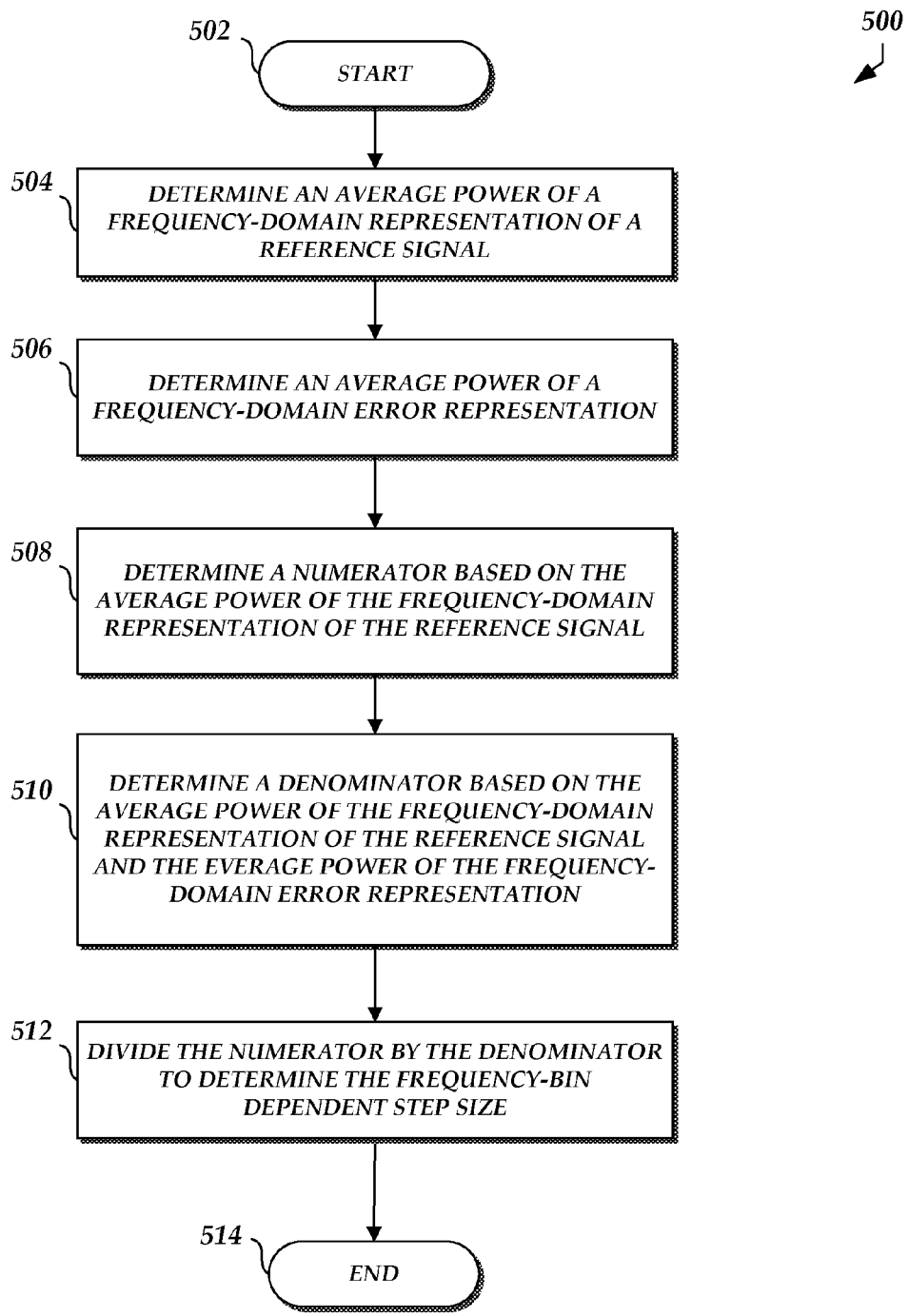
FIG. 5 is a flow diagram of an illustrative process for determining a frequency-bin dependent step size according to an embodiment.

Turning now to FIG. 5, an example process 500 for determining a frequency-bin dependent step size VSS(m) according to an embodiment will be described. The process 500 may be embodied in hardware, a set of executable program instructions, or a combination of hardware and executable program instructions. The process 500 may be performed, for example, by the step size controller 160 of FIG. 2. Although the process 500 of FIG. 5 will be described with respect to the components of FIG. 2, the process 500 is not limited to implementation by, or in conjunction with, any specific component shown in FIG. 2. In some embodiments, the process 500, or some variant thereof, may be implemented by alternative components, by the components of FIG. 2 in a different configuration, etc.

The process 500 begins at block 502. At block 504, the step size controller 160 determines an average power (e.g., a standard deviation) of the frequency-domain representation of the reference signal. For example, an average power of the frequency-domain representation of the reference signal $\sigma_x^2(m)$ may be determined based on the equation $\sigma_x^2(m) = \beta^* \sigma_x^2 + (1-\beta)^* |X(m)|^2$.

At block 506, the step size controller 160 determines an average power of the frequency-domain error representation. For example, an average power of the frequency-domain error representation $\sigma_e^2(m)$ may be determined based on the equation $\sigma_e^2(m) = \beta^* \sigma_e^2 + (1-\beta)^* |E(m)|^2$.

At block 508, the step size controller 160 determines a numerator based on the average power of the frequency-domain representation of the reference signal. At block 510, the step size controller 160 determines a denominator based on the average power of the frequency-domain representation of the reference signal and the average power of the frequency-domain error representation. At block 512, the step size controller 160 divides the numerator by the denominator to determine the frequency-bin dependent step size VSS(m). For example, the step size controller 160 may perform blocks 508, 510, and 512 to determine the frequency-bin dependent variable step size VSS(m) based on the following equation:

$$\text{VSS}(m) = \alpha^* \sigma_x^2(m) / (\alpha^* \sigma_x^2(m) + \sigma_e^2(m)), m=0,1,\ldots,M-1$$

At block 514, the process 500 ends. The process 500 may be executed in a continuous or substantially continuous loop as the variable step size for each frequency bin is computed and as additional frames are processed.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of performing acoustic echo cancellation, the method comprising:
    receiving an output signal;
    determining a frequency-domain representation of the output signal, the frequency-domain representation comprising a plurality of frequency bins;
    calculating, for a first of the plurality of frequency bins, a frequency-domain estimated echo using the frequency-domain representation of the output signal and a first adaptive filter, wherein the first adaptive filter corresponds to the first frequency bin and comprises a plurality of filter taps;
    determining a time-domain estimated echo using the frequency-domain estimated echo;
    receiving a microphone signal comprising an actual echo of the output signal;
    determining a time-domain error using the time-domain estimated echo and the microphone signal;
    determining a frequency-domain error representation of the time-domain error;
    determining a step size; and
    determining an updated first adaptive filter using the first adaptive filter, the frequency-domain error representation, and the frequency-domain representation of the output signal.

2. The method of claim 1, wherein a number of the plurality of filter taps of the first adaptive filter is based on a harmonic distortion level at the first frequency bin.

3. The method of claim 1, further comprising calculating the frequency-domain estimated echo corresponding to a second of the plurality of frequency bins using a weight corresponding to the second frequency bin.

4. The method of claim 1, wherein the frequency-domain estimated echo is calculated using at least one previously-calculated frequency-domain estimated echo for the first frequency bin.

5. The method of claim 1, wherein the step size is frequency bin dependent.

6. The method of claim 5, wherein determining the frequency-bin dependent step size comprises:
    determining an average power of the frequency-domain representation of the output signal;
    determining an average power of the frequency-domain error representation;
    determining a numerator using the average power of the frequency-domain representation of the output signal;
    determining a denominator using the average power of the frequency-domain representation of the output signal and the average power of the frequency-domain error representation;
    dividing the numerator by the denominator to determine the frequency-bin dependent step size.

7. The method of claim 5, wherein the updated first adaptive filter is determined using the frequency-bin dependent step size.

8. One or more non-transitory computer-readable storage media comprising computer-executable instructions to:
    determine a frequency-domain representation of a reference signal, the frequency-domain representation comprising a plurality of frequency bins;
    calculate a frequency-domain estimated echo using the frequency-domain representation of the reference signal and a first adaptive filter;
    determine a time-domain estimated echo using the frequency-domain estimated echo;
    determine a time-domain error using the time-domain estimated echo and an input signal;
    determine a frequency-domain error representation of the time-domain error;
    determine a frequency-bin dependent step size using an average power of the frequency-domain representation of the reference signal and an average power of the frequency-domain error representation; and
    determine an updated first adaptive filter using the first adaptive filter, the frequency-domain error representation, the frequency-domain representation of the reference signal, and the frequency-bin dependent step size.

9. The one or more non-transitory computer-readable storage media of claim 8, further comprising computer-executable instructions to:
determine a numerator based on the average power of the frequency-domain representation of the reference signal;
determine a denominator based on the average power of the frequency-domain representation of the reference signal and the average power of the frequency-domain error representation; and
divide the numerator by the denominator to determine the frequency-bin dependent step size.

10. The one or more non-transitory computer-readable storage media of claim 9, wherein the frequency-bin dependent step size becomes smaller as the average power of the frequency-domain error representation becomes larger relative to the average power of the frequency-domain representation of the reference signal.

11. The one or more non-transitory computer-readable storage media of claim 8, wherein the first adaptive filter corresponds to a first frequency bin and comprises a plurality of filter taps.

12. The one or more non-transitory computer-readable storage media of claim 11, wherein a number of the plurality of filter taps of the first adaptive filter is based on a harmonic distortion level at the first frequency bin.

13. The one or more non-transitory computer-readable storage media of claim 11, further comprising computer-executable instructions to calculate the frequency-domain estimated echo corresponding to a second of the plurality of frequency bins using a weight corresponding to the second frequency bin.

14. The one or more non-transitory computer-readable storage media of claim 11, wherein calculation of the frequency-domain estimated echo further uses at least one previously-calculated frequency-domain estimated echo for the first frequency bin.

15. A device comprising:
a means for determining a frequency-domain representation of a reference signal, the frequency-domain representation comprising a plurality of frequency bins;
a means for calculating, for a first of the plurality of frequency bins, a frequency-domain estimated echo using the frequency-domain representation of the reference signal and a first adaptive filter, wherein the first adaptive filter corresponds to the first frequency bin and comprises a plurality of filter taps;
a means for determining a time-domain estimated echo using the frequency-domain estimated echo;
a means for determining a time-domain error using a difference between the time-domain estimated echo and an input signal;
a means for determining a frequency-domain error representation of the time-domain error; and
a means for determining an updated first adaptive filter using the first adaptive filter, the frequency-domain error representation, and the frequency-domain representation of the reference signal.

16. The device of claim 15, further comprising a means for calculating the estimated echo corresponding to a second of the plurality of frequency bins using a weight corresponding to the second frequency bin.

17. The device of claim 15, wherein calculation of the frequency-domain estimated echo further uses at least one previously-calculated frequency-domain estimated echo for the first frequency bin.

18. The device of claim 15, further comprising a means for determining a frequency-bin dependent step size.

19. The device of claim 18, wherein the means for determining the frequency-bin dependent step size comprises:
a means for determining a numerator based on an average power of the frequency-domain representation of the reference signal;
a means for determining a denominator based on the average power of the frequency-domain representation of the reference signal and an average power of the frequency-domain error representation; and
a means for dividing the numerator by the denominator to determine the frequency-bin dependent step size.

20. The device of claim 18, wherein determining the updated first adaptive filter further uses the frequency-bin dependent step size.

* * * * *